United States Patent
Kumbi et al.

(10) Patent No.: US 8,185,546 B2
(45) Date of Patent: May 22, 2012

(54) ENHANCED CONTROL TO USERS TO POPULATE A CACHE IN A DATABASE SYSTEM

(75) Inventors: Niranjan Kumbi, Davanagere (IN); Amulya Mishra, Jharsuguda (IN)

(73) Assignee: Oracle International Corporation, Redwood Shores, CA (US)

( * ) Notice: Subject to any disclaimer, the term of this patent is extended or adjusted under 35 U.S.C. 154(b) by 728 days.

(21) Appl. No.: 11/860,550

(22) Filed: Sep. 25, 2007

(65) Prior Publication Data

US 2009/0049013 A1 Feb. 19, 2009

(30) Foreign Application Priority Data

Aug. 13, 2007 (IN) .......................... 1798/CHE/2007

(51) Int. Cl.
*G06F 17/30* (2006.01)
(52) U.S. Cl. ...................................... 707/770; 707/802

(58) Field of Classification Search .................. 711/118; 705/14.52; 707/802, 770
See application file for complete search history.

(56) References Cited

U.S. PATENT DOCUMENTS

| | | | |
|---|---|---|---|
| 2007/0294319 A1* | 12/2007 | Mankad et al. | 707/204 |
| 2008/0126706 A1* | 5/2008 | Newport et al. | 711/118 |
| 2008/0209328 A1* | 8/2008 | Parkinson | 715/733 |
| 2009/0172123 A1* | 7/2009 | Ewing | 709/206 |
| 2010/0005512 A1* | 1/2010 | Wahl | 726/4 |
| 2010/0076845 A1* | 3/2010 | Ramer et al. | 705/14.52 |

* cited by examiner

*Primary Examiner* — Shahid Alam
(74) *Attorney, Agent, or Firm* — Narendra Reddy Thappeta

(57) ABSTRACT

Providing enhanced control to users to populate a cache in a database system. A user provides an explicit indication indicating the specific information (available from the data stored in a storage of the database system) to be populated in the cache, and the cache is populated with the corresponding information. The information in the cache (whether due to explicit indications or otherwise) can then be used to generate results of queries, without having to access the same information from the storage of the database system.

30 Claims, 7 Drawing Sheets

Customer 310

| ROWID 320 | CustomerID 322 | LoginID 323 | Password 325 | FullName 327 | Branch 329 |
|---|---|---|---|---|---|
| 1001 | C251 | john_mathew | *** | John Mathew | CA |
| 1002 | C252 | ronny_mathew | *** | Ronny Mathew | BAN |
| 1003 | C253 | amy_marlin | *** | Amy Marlin | BAN |
| 1004 | C254 | jim_carry | *** | Jim Carry | CA |

331→ 1001
332→ 1002
333→ 1003
334→ 1004

Account 340

| ROWID 350 | AccountID 352 | CustomerID 353 | Type 355 | Balance 357 | Updated 359 |
|---|---|---|---|---|---|
| 2001 | A511 | C251 | SB | 1000.00 | 23/02/2007 |
| 2002 | A512 | C251 | CD | 2000.00 | 08/04/2007 |
| 2003 | A513 | C251 | RD | 3000.00 | 08/04/2007 |
| 2004 | A514 | C252 | RD | 3000.00 | 16/03/2007 |
| 2005 | A515 | C253 | SB | 1500.00 | 17/03/2007 |
| 2006 | A516 | C254 | CD | 6500.00 | 05/05/2007 |
| 2007 | A517 | C254 | SB | 7000.00 | 05/05/2007 |

CacheRelation 510

| ROWID 520 | QueryTable 522 | QueryColumn 524 | CacheTable 526 | CacheColumn 528 | ResultBased 529 |
|---|---|---|---|---|---|
| 5001 | Customer | Branch | Customer | ROWID | No |
| 5002 | Account | AccountID | Transaction | * | Yes |
| 5003 | Customer | CustomerID | Account | ROWID | Yes |

| Customer.Branch | Customer.ROWID |
|---|---|
| CA | 1001, 1004 |
| BAN | 1002, 1003 |

ENHANCED CONTROL TO USERS TO POPULATE A CACHE IN A DATABASE SYSTEM

RELATED APPLICATION

The present application is related to and claims priority from the co-pending India Patent Application entitled, "ENHANCED CONTROL TO USERS TO POPULATE A CACHE IN A DATABASE SYSTEM", Serial Number: 1798/CHE/2007, Filed: Aug. 13, 2007, Applicant: Oracle International Corporation, naming the same inventors Niranjan Kumbi and Amulya Mishra as in the subject patent application, and is incorporated in its entirety herewith.

BACKGROUND

1. Technical Field

The present disclosure relates to database technologies and more specifically to providing enhanced control to users to populate a cache in a database system.

2. Related Art

A database system generally refers to a system, which permits storage and accessing of data using queries. For example, when a database system is based on a relational model of data, the data can be stored, retrieved, deleted and modified using SQL (structured query language) queries.

Caches are often provided within a database system, typically to enhance the speed with which queries are processed. In general, the aggregate data served by a database system is typically stored in a non-volatile memory (for data persistence as well to support large volumes of data), while the cached (stored in the cache) information is stored in memories (e.g., random access memory) providing faster access.

In one prior approach, the data provided as a response to a query is cached such that the same data can be quickly provided (as a response) should the same query be received later. Intermediate results/product such as the result of a join may also be cached.

Thus, in such a prior approach, a cache is populated only when corresponding queries are processed. It is generally desirable that users be provided enhanced control to populate the cache in a database system.

BRIEF DESCRIPTION OF THE DRAWINGS

Example embodiments of the present invention will be described with reference to the accompanying drawings briefly described below.

FIG. 3 depicts sample data stored in the form of tables in a database system in one embodiment.

FIG. 5A depicts a sample cache relation data indicating the specific information to be loaded in a cache in a database system when a corresponding table (and/or column/row) is specified in a query in one embodiment.

FIG. 5B depicts sample information that is loaded in a cache in a database system as indicated by a cache relation data in response to a query specifying a corresponding table and column in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
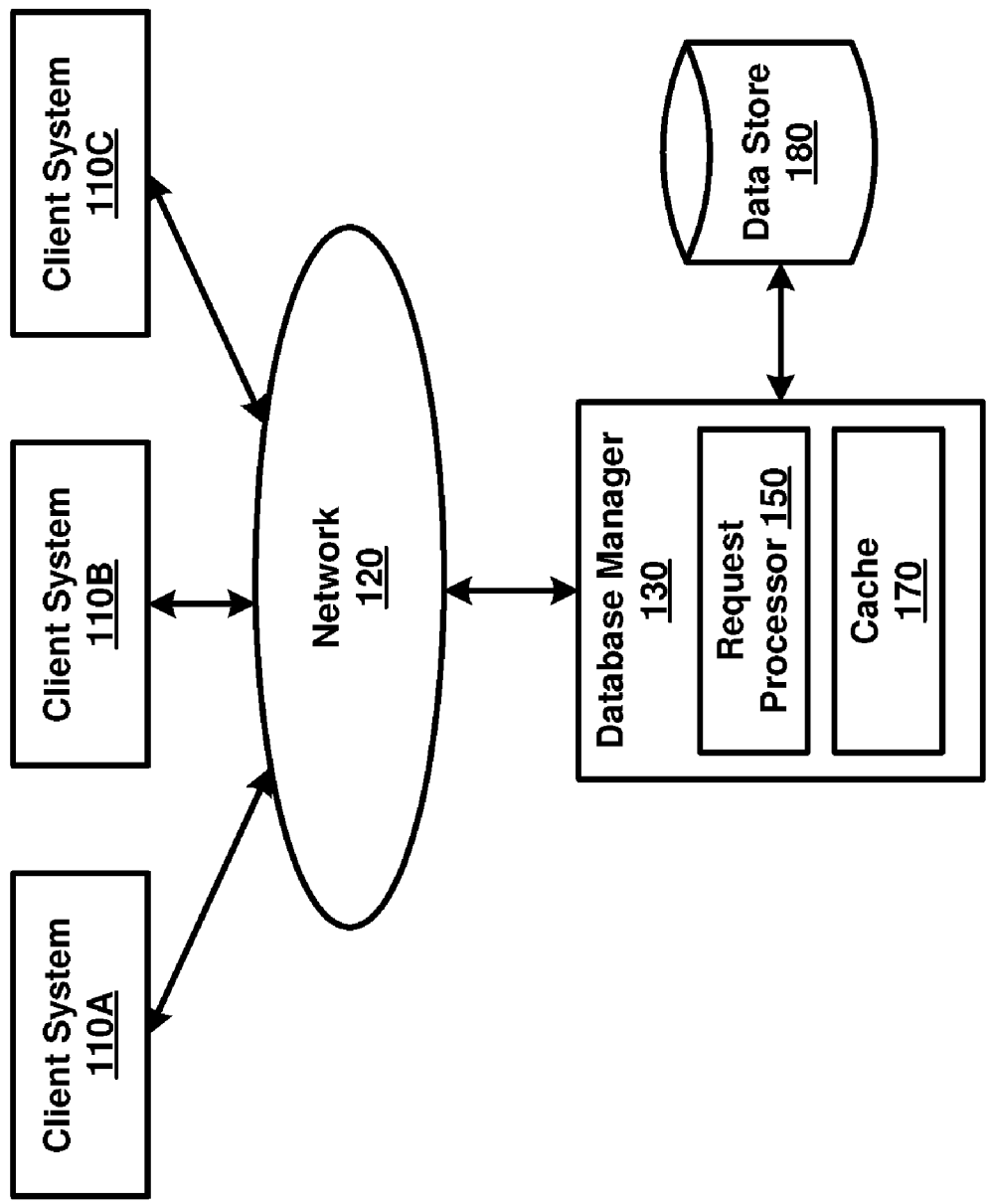
FIG. 1 is a block diagram illustrating an example computing system in which several aspects of the present invention can be implemented.

An aspect of the present invention enables users to provide explicit indications indicating that a cache in a database system is to be populated with specific information (available from the data stored in a storage of the database system), and the cache is populated with the corresponding information.

In contrast, at least in some prior approaches noted in the background section above, the user is not provided the ability to explicitly indicate that any (desired) information should be cached. Rather, processing of queries causes the cache to be populated with various information, as noted there. Furthermore, the internal operation of a database system (in response to processing of queries) determines the specific information to be cached without the user having the ability to specify such information explicitly.

The information in the cache (populated due to explicit indications or otherwise) can then be used to generate results of queries, without having to access the related information from a storage of the database system.

Such a feature can be advantageously used when the specific information in a database system required for processing future queries is known a priori (beforehand). Such knowledge may be available, for example, from the intended/natural use of a software application. Using such knowledge, a cache may be populated with the specific information required before the corresponding query is received at the database system, thereby enhancing the speed of processing the query.

In one embodiment, the explicit indication is included (as a hint) as a part of a query sent to a database system. On receiving such a hint, the information explicitly indicated by the hint is populated in a cache in the database system.

In another embodiment, an administrator (or another user) maintains a cache relation data indicating the specific information in a database system that is to be loaded into a cache I in the database system when a corresponding table (or a portion thereof) is specified in a query. On receiving a query specifying a specific table (and/or a specific column), the database system inspects the cache relation data to determine the information to be loaded in the cache (corresponding to the specific table and/or column) and then populates the cache with the determined information.

The information that is stored in the cache (in response to receiving the explicit indication) can include one (or more) of data stored in some of the rows of tables contained in a database system, index information specifying the specific rows of a table matching each of the values in a column of the same table, or relation information indicating the specific rows of a second table matching a corresponding value in a first column of a first table.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

2. Example Environment

FIG. 1 is a block diagram illustrating an example computing system in which several aspects of the present invention can be implemented. The block diagram is shown containing client systems 110A-110C, network 120, database manager 130 (containing request processor 150 and cache 170), and data store 180.

Merely for illustration, only representative number/type of systems are shown in the Figure. Many environments often contain many more systems, both in number and type, depending on the purpose for which the environment is designed. Each block of FIG. 1 is described below in further detail.

Network 120 provides connectivity between various client systems 110A-110C, and database manager 130. Network 120 may be implemented using protocols such as Internet Protocol (IP) well known in the relevant arts.

Data store 180 provides a non-volatile storage in which database manager 130 stores and retrieves data. Data store 180 along with database manager 130 may be viewed together as a database system providing several features of the present invention. In one embodiment, the database system is implemented using relational database technologies and therefore provides storage and retrieval of data using structured queries such as SQL. Database manager 130 processes the queries by storing/retrieving the data from data store 180.

Each of client systems 110A-110C represents a system such as a personal computer, workstation, mobile station, etc., used by a user to generate requests (specifying queries) to database manager 130. The requests may be generated according to a suitable interface provided by applications executing in the client system. In general, a client system sends requests (specifying queries) to database manager 130 and receives corresponding responses containing the results of performance of the queries.

Database manager 130 represents a server, such as a database server, which performs queries (which specify insert, update, delete, select, type operations in relational environments) requested by client systems 110A-110C. Database manager 130 may perform the queries on data maintained internally (e.g., cache 170) or on external data (stored in data store 180) and then send the results of performance of the queries to the requesting client system. Database manager 130 may also contain software programs such as operating system, device drivers, etc., (not shown) that provide a run time environment facilitating execution of request processor 150 and maintenance of cache 170.

Cache 170 maintains copies of data (in a memory in database manager 130) facilitating faster performance of queries received from client systems 110A-110C. Though shown within the same system as in which request processor 150 is implemented, in alternative embodiments, cache 170 may be implemented external to such systems (e.g., as an individual system/unit external to database manager 130), but within the database system.

Request processor 150 receives requests specifying queries from client systems 110A-110C, performs the queries using the data in either cache 170 and/or data store 180, and sends the result of performance of the queries to the requesting client system. Request processor 150 may be implemented as a software program (or a portion thereof) executing in a run time environment of database manager 130.

On receiving a request specifying a query, request processor 150 first determines the manner in which (and/or the data required) for performance of the requested query. Request processor 150 then checks whether the data required for performance of the query is present in cache 170. In the scenario that cache 170 is populated with the required data, request processor 150 performs the query with the data in cache 170. Alternatively, request processor 150 retrieves the required data from data store 180 and then performs the query. In case performance of the query requires a write operation to data store 180, request processor 150 stores the updated data accordingly. Request processor 150 then sends the result of performance as a response to the request.

It may be appreciated that request processor 150 during (or after) the performance of the query, may populate cache 170 as noted above in the background section. As also noted there, in such a prior approach, the user may not be provided the ability to explicitly indicate that the cache needs to be populated with any specific information.

An aspect of the present invention provides enhanced control to users to populate a cache in a database system as described below with examples.

3. Populating a Cache in a Database System

Figure 2:
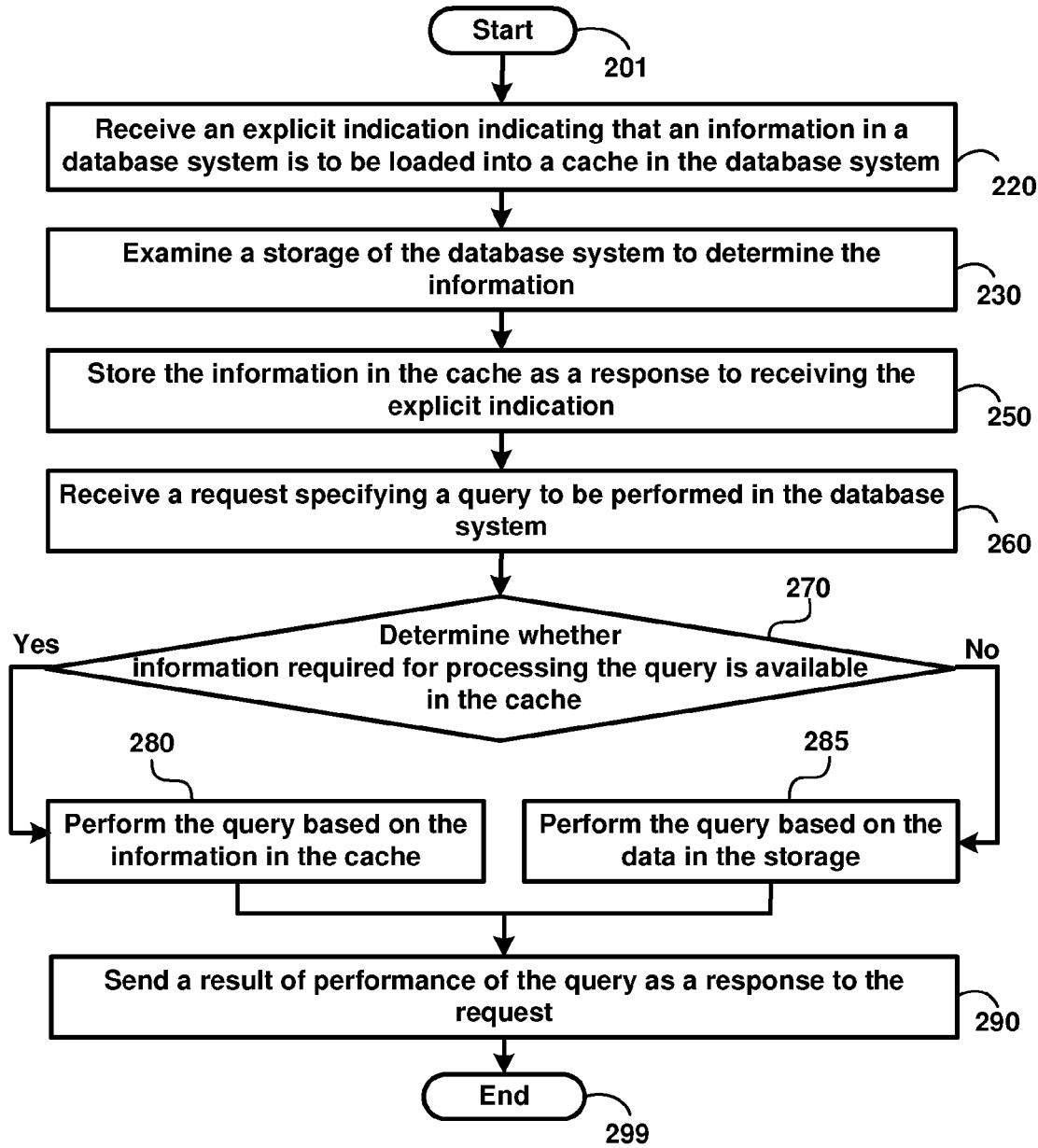
FIG. 2 is a flowchart illustrating the manner in which enhanced control to users to populate a cache in a database system is provided according to an aspect of the present invention.

FIG. 2 is a flowchart illustrating the manner in which enhanced control to users to populate a cache in a database system is provided according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, request processor 150 receives an explicit indication indicating that an information in a database system is to be loaded into cache 170 in the database system. The explicit indication (and the information to be loaded in the cache) may be specified in any convenient/pre-defined manner. Some embodiments of specifying the explicit indication (and the information to be loaded in the cache) are described in below sections with examples. Similarly, any information of interest in the database system may be pre-loaded to the extent such information is useful in processing future queries/requests.

In step 230, request processor 150 examines a storage of the database system (such as data store 180) to determine the information. Depending on the type of information indicated by the explicit indication, request processor 150 may retrieve the corresponding information from data store 180 or alternatively generate the information based on the data stored in data store 180.

In step 250, request processor 150 stores the information in cache 170 as a response to receiving the explicit indication. The information may be populated in a manner enabling request processor 150 to identify and use the information for processing future queries/requests. The information may be stored associated with the explicit indication and/or with details of the data based on which the information is generated.

In step 260, request processor 150 receives a request specifying a query to be performed in the database system. In case of relational database, the queries may be received in SQL-type formats. The request may be received from one of client systems 110A-110C.

In step 270, request processor 150 determines whether information required for processing the query is available in cache 170. The query may directly identify the information or alternatively, request processor 150 on receiving the query may determine that the information is required for performance of the query, for example, based on the manner in which the query is to be performed. If the information is present in cache, control transfers to step 280 and to step 285 otherwise.

In step 280, request processor 150 performs the query based on the information in the cache. While the information in the cache is used, request processor 150 may access data store 180 for any additional data required to perform the query.

In step 285, request processor 150 performs the query based on the data in data store 180. It should be appreciated that request processor 150 may need to load/generate the information that was absent in cache 170, and thus may require more time/resources to perform the query compared to when step 280 is executed.

In step 290, request processor 150 sends a result of performance of the query (in steps 280/285) as a response to the request. The result may contain any data that is specified to be retrieved by the query, and/or success/failure type status information of performance of the query. The flow chart ends in step 299.

It may be appreciated that the speed of performance of the query in step 280 is enhanced, since at least some of the information required for performing the query is already present in a cache (thereby avoiding retrieval of information from a storage such as data store 180, which is generally slower than accessing information in the cache). The required information may already be populated in the cache in response to receiving an explicit indication that the information is to be loaded into the cache (steps 220, 230 and 250).

Thus, by providing a user enhanced control to populate a cache in a database system, the user is facilitated to anticipate the information required for performance of queries and to load the information (by sending explicit indications) in the cache before sending the queries. Such a feature may be desirable specifically for developers (of software applications), since developers generally have a prior knowledge about the queries sent to a database system.

The features described above can be implemented in several environments. In an embodiment, database system (database manager 130 and data store 180) implements a relational model of data, wherein the data is maintained as rows (relations) in tables defined in the database system. Each table is also associated with columns, identifying individual elements of each row/relation. Accordingly, the description is continued describing the details of a sample source data used for describing the operation of several features of the present invention.

4. Sample Data

FIG. 3 depicts sample data stored in the form of tables in a database system in one embodiment. The data may be stored in a storage (such as data store 180) associated with the database system.

Broadly, the sample data (shown in tables 310 and 340) depict information about the customers and the accounts maintained by the customers in a financial institution. Each of the rows in the tables is associated with a row identifier ("ROWID") uniquely identifying each row in the database system. The row identifiers facilitate retrieval of corresponding information (the data in the row) from data store 180. The row identifiers may also be used for identifying information in cache 170.

Table 310 depicts a table (with name "Customer") containing information relating to the customers of the financial institution. Column 320 (labeled "ROWID") specifies the unique row identifier for each of the customers. Column 322 (labeled "CustomerID") specifies a unique identifier for each of the customers. Columns 323 (labeled "LoginID") and 325 (labeled "Password") specify the authentication information of each of the customers. The values in column 325 are shown as "*" indicating that the values are encrypted. Columns 327 (labeled "FullName") and 329** (labeled "Branch") specify the full name and the branch corresponding to each of the customers.

Though both columns "ROWID" and "CustomerID" (or "AccountID") uniquely identify each of the customers (or accounts), it may be appreciated that the values of column "ROWID" are maintained internally by the database system (typically by request processor 150 in data store 180) while the values of "CustomerID" (or "AccountID") are maintained by users using database system. Thus, "ROWID" enables database manager 130 (and data store 180) to maintain an internal state of the database system without requiring any user specific inputs.

Each of rows 331-334 specifies information about a corresponding customer. In particular, row 331 (with row identifier "1001" as shown in column 320) specifies a customer with unique identifier "C251" (as shown in column 322) having authentication information "john_mathew" and "*" (as shown in respective columns 323 and 325) with full name "John Mathew" (as shown in column 327) and associated with the branch "CA" (as shown in column 329). Similarly, rows 332-334** specify information about other customers.

Table 340 depicts a table (with name "Account") containing information relating to the accounts of the customers of the financial institution. Column 350 (labeled "ROWID") specifies the unique row identifier for each of the accounts. Column 352 (labeled "AccountID") specifies a unique identifier for each of the accounts. Column 353 (labeled "CustomerID") specifies the customer associated with the account by specifying the unique identifier associated with the customers for each of the accounts. Columns 355 (labeled "Type"), 357 (labeled "Balance") and 359 (labeled "Updated") specify the type, the balance amount existing, and the date of last update corresponding to each of the accounts.

Each of rows 361-367 specifies information about an account. In particular, row 361 (with row identifier "2001" as shown in column 350) specifies an account with unique identifier "A511" (as shown in column 352) associated with the customer having identifier "C251" (as shown in column 353) of type "SB" (as shown in column 355) having a balance amount of "1000.00" (as shown in column 357) and which was last updated on "23/02/2007" (as shown in column 359). Similarly, rows 362-367 specify information about other accounts.

The details of the tables 310 and 340 (such as the name, type and description of each column/table) may be provided to users using one of client system 110A-110C, thereby enabling the users (via appropriate user interface, noted above) to send requests specifying queries (based on the tables) to database manager 130. The description is continued describing sample queries received by database manager 130 in an embodiment.

5. Sample Queries

Figure 4A:
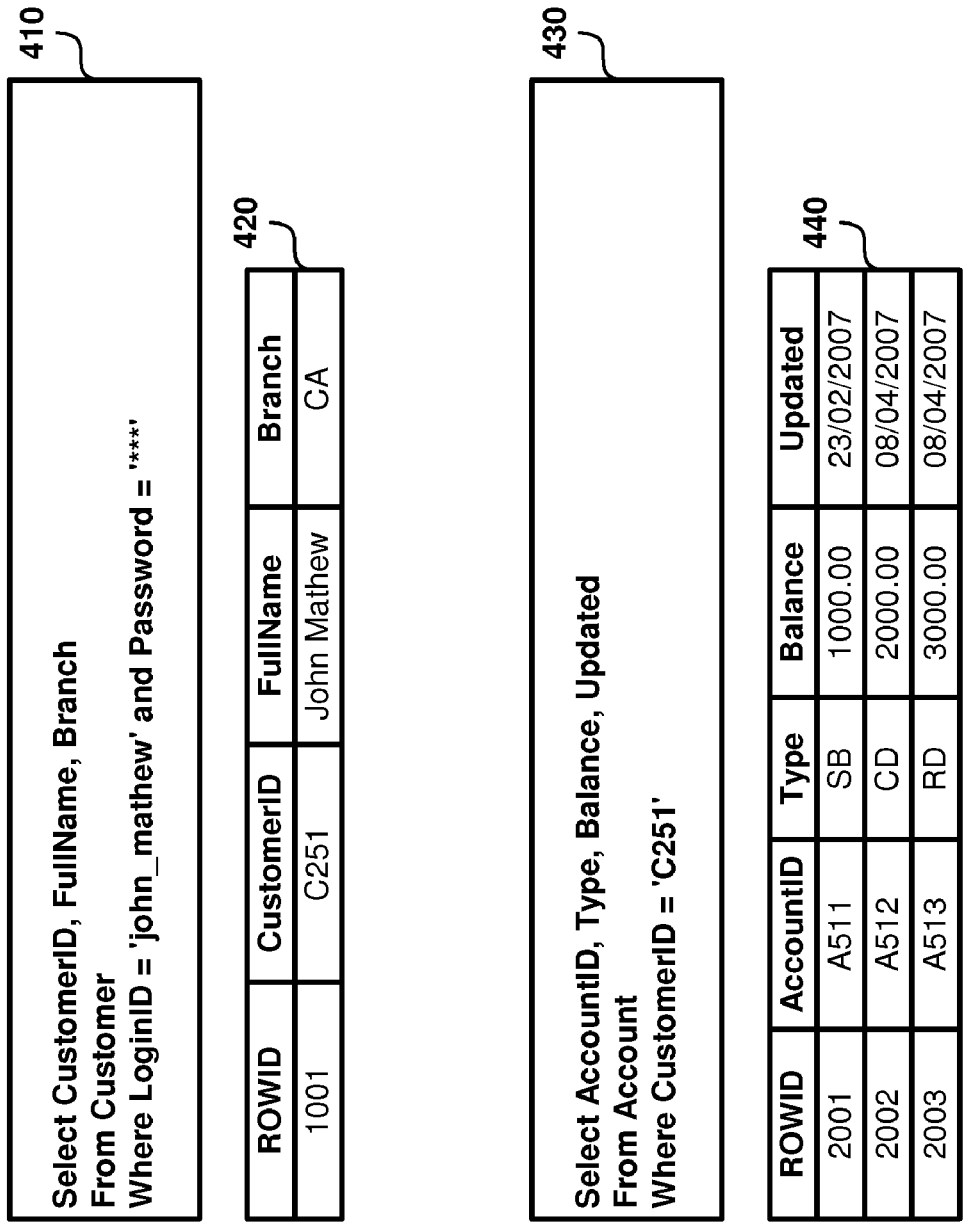
FIG. 4A depicts sample queries received as requests by a database system and the corresponding results of performance of the queries generated by the data base system in an embodiment.

FIG. 4A depicts sample queries received as requests by a database system and the corresponding results of performance of the queries generated by the data base system in an embodiment. The requests specifying the queries (in form of SQL) may be received from one of client systems 110A-110C and the database system may send the results of performance of the queries as corresponding responses to the requesting client system.

Broadly, the queries may be sent by a developer designing a software application (executing in one of client systems 110A-110C) for a financial institution maintaining customer and account information as depicted in FIG. 3. As such, the developer may design the software application to include a login page for authentication of a customer, a home page containing the information about all the accounts associated with the authenticated customer (shown after successful authentication of the information provided in login page).

Query 410 depicts a query for retrieving customer information such as "CustomerID" "FullName" and "Branch" from the "Customer" table for the customer whose authentication information is "john_mathew" and "***" (corresponding to the "LoginID" and "Password" columns). Query 410 may be received from the software application after a customer provides the authentication information in the login page.

Result 420 depicts the result of performance of the (select/retrieve) query 410 containing the rows matching the criteria (customers whose authentication information is specified) in query 410. As such, result 420 contains only row 331 (with the row identifier "1001") corresponding to the customer having the authentication information specified in query 410, thereby indicating successful authentication. In contrast, when none of the rows in "Customer" table 310 matches the authentication information, result 420 contains no rows indicating a failure of authentication.

It may be appreciated that the row identifiers may not be included in the response sent to the requesting client, or the row identifiers may be encoded in the response to prevent users (receiving the response) from accessing the values of the row identifiers. It may further be appreciated that result 420 (including the row identifiers) may be populated in cache 170.

Query 430 depicts a query for retrieving account information such as "AccountID", "Type", "Balance" and "Updated" from the "Account" table for all the accounts associated with the customer having the unique identifier "C251". It may be observed that the customer identifier specified in query 430 corresponds to the customer identifier included in result 420. Query 430 may be received from the software application after successful authentication (as may be indicated by the number of rows in result 420).

Result 440 depicts the result of performance of the query 430 containing the requested account information corresponding to the accounts associated with the customer identified by "C251". Result 440 is shown containing three rows corresponding to rows 361, 362, and 363 in "Account" table 340 (with corresponding row identifiers "2001", "2002" and "2003"). As described above, result 440 (with or without the row identifiers) may be sent as a response to query 430 and also populated in cache 170.

It may be observed that the information depicted in result 440 is related to the information depicted in result 420 (since the value "C251" in the column "CustomerID" is the same for all the rows). As such, the developer may desire that the information (or any data indicating the information) in result 440 be loaded into cache 170 during the performance of query 410, thereby enhancing the speed of processing query 430.

An aspect of the present invention enables a user/developer to send an explicit indication to a database system indicating the specific information to be loaded into a cache in the database system. In one embodiment, the user/developer may include the explicit indication in a request (for example the request specifying query 410) as a hint to the database system as described below with examples.

6. Populating Cache Using Hints

Figure 4B:
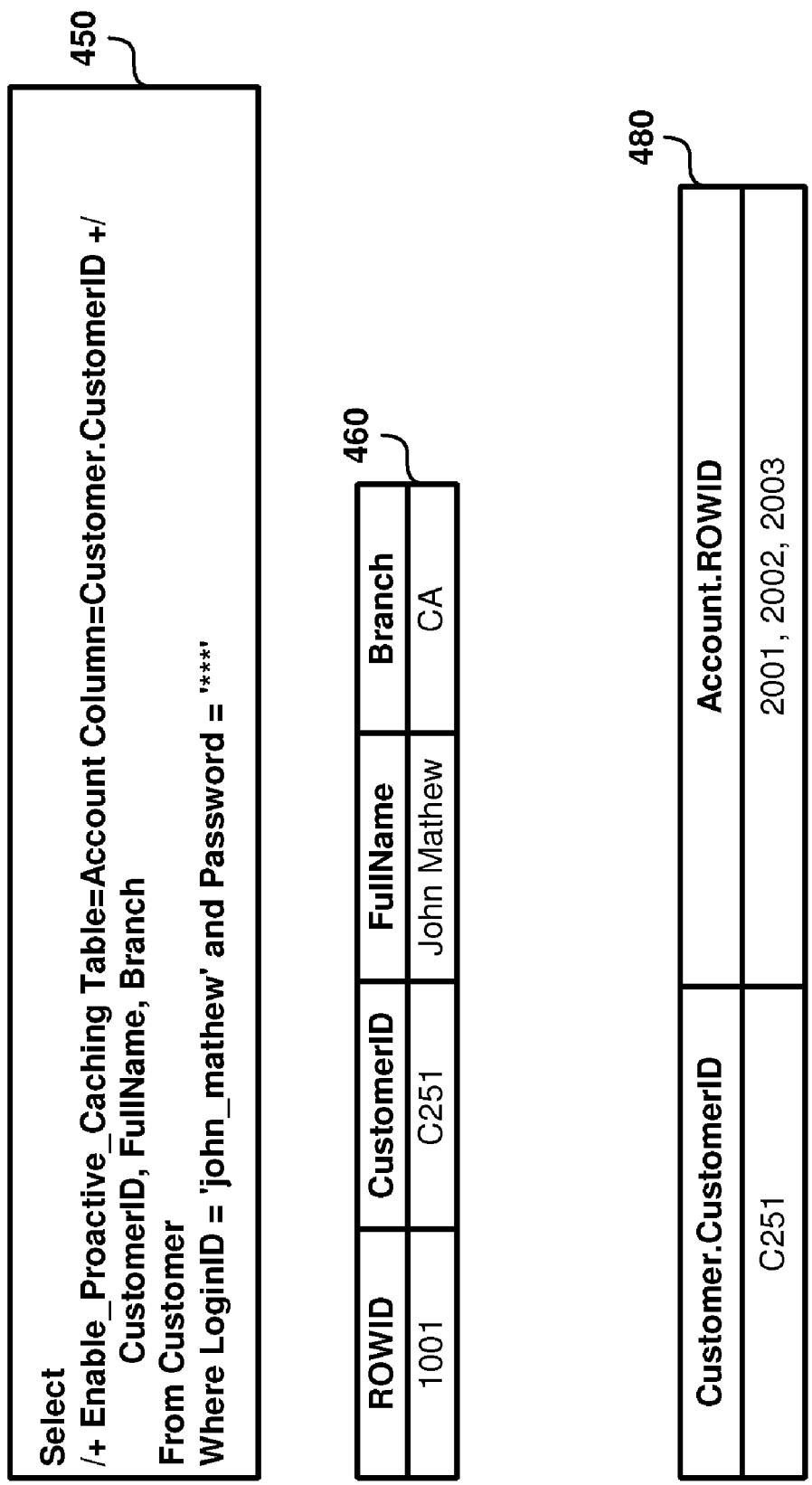
FIG. 4B depicts sample requests containing queries and hints (explict indications) indicating the information to be loaded in a cache in a database system in an embodiment.

FIG. 4B depicts sample requests containing queries and hints (explicit indications) indicating the information to be loaded in a cache in a database system in an embodiment. Requests specifying the queries (in form of SQL) and the hints may be received from one of client systems 110A-110C.

Request 450 depicts a query similar to query 410 for retrieving customer information such as "CustomerID" "FullName" and "Branch" from the "Customer" table for the customer whose authentication information is "john_mathew" and "***" (corresponding to the "LoginID" and "Password" columns).

Request 450 further contains a hint in the form of the string "/+ Enable_Proactive_Caching Table=Account Column=Custmomer.CustomerID +/". The hint contains predefined keywords such as "Enable_Proactive_Caching" representing the explicit indication indicating that the cache is to be populated with specific information, "Table" indicating the specific table from which the specific information is to be retrieved, and "Column" indicating the column based on which the specific information is to be retrieved.

It may be observed that the characters "/+" and "+/" used for delimiting the hint are often used for delimiting comments included in queries and as such a database system configured/designed to ignore such comments may ignore the hint and generate a result (such as result 460) similar to result 420, without caching any information.

In one embodiment, only the row identifiers corresponding to the rows in the table "Account" (associated to the keyword "Table") associated with the values of the column "Customer CustomerID" (associated to the keyword "Column") are maintained in a cache. Further, it is assumed that only the rows corresponding to the values of the column as indicated by the result of performance of the query are to be maintained in the cache.

Thus, the above hint in request 450 indicates that the row identifiers of the rows in the table "Account" corresponding to values in the column "Customer.CustomerID" as indicated by the result of performing the query is to be populated in cache 170.

Result 460 depicts the result of performance of the request 450 (containing the rows matching the criteria specified) and is similar to result 420 and is not described in detail for conciseness. It may be observed that result 460 contains a column "CustomerID", and as such only the row identifiers of the rows in the table "Account" corresponding to the values of the column "CustomerID" in result 460 may be cached.

Data portion 480 depicts the information that is stored in cache 170 in response to receiving the hint in request 450. As indicated by the hint, the row identifiers of the rows in the "Account" table (as shown in the column labeled "Account.ROWID") corresponding to the values ("C251") of the column "CustomerID" as indicated by result 460 (as shown in the column labeled "Account.CustomerID") is stored in cache 170.

It may be appreciated that the information depicted in data portion 480 corresponds to relation information indicating specific ones of the plurality of rows of a second table ("Account") matching a corresponding value in a first column ("CustomerID") of a first table ("Customer"). It may be further appreciated that such relation information may need to be generated by examining the data in the two tables ("Account" and "Customer") maintained in a storage of the database system.

Further, it may be necessary that the table "Account" contains a reference to the column "Customer.CustomerID", thereby facilitating identification of the rows in the table "Account" corresponding to the values in the column "CustomerID". In an embodiment, the column "CustomerID" is indicated as a primary key in the table "Customer" and a reference to the same column is provided by indicating the column "CustomerID" as a foreign key in the table "Account".

On receiving a next query 430, request processor 150 may inspect cache 170 to determine whether the data required for performing the query is populated in the cache. On determining that data portion 480 is populated in cache 170, request processor 150 may retrieve rows 361, 362 and 363 corresponding to the respective row identifiers 2001, 2002 and 2003 associated with the value "C251" for column "CustomerID" as indicated by data portion 480. Request processor 150 may then form a result (similar to result 440) and send the result as a response to query 430.

Thus, a developer by including a hint in request 450 causes data portion 480 indicating the information of interest to be populated in a cache in a database system, thereby facilitating enhanced speed of processing of query 430. Though queries 410 (or 450) and 430 are shown as having information related to each other (such as column "CustomerID"), it might be appreciated that query 410 (or 450) may be modified to populate information unrelated to the query contained in the request.

Similarly, more keywords (in a hint) can be defined to specify different types of information, specific items within an information type and management commands (e.g., to remove the specific information after a desired duration) directed to the cache.

It may be desirable that the burden of including the explicit indication (as a hint) in a request be reduced for users/developers sending the requests (using one of client systems 110A-110C). As such, in an alternative embodiment, an administrator (or another user) maintains a cache relation data indicating the specific information in a database system that is to be loaded into a cache in the database system as described below with examples.

7. Populating Cache Using Cache Relation Data

FIG. 5A depicts a sample cache relation data indicating the specific information to be loaded in a cache in a database system when a corresponding table (and/or column/row) is specified in a query in one embodiment. The cache relation data may be maintained by request processor 150 in a memory in database manager 130 or stored in the form of a table in data store 180.

Table 510 depicts a table (with name "CacheRelation") indicating the information to be loaded into a cache in a database system when a corresponding table/column is specified in a query.

Column 520 (labeled "ROWID") specifies the unique row identifier for each of the cache relations. Columns 522 (labeled "QueryTable") and 524 (labeled "QueryColumn") indicate respectively the names of the table and column that needs to be specified in a query for each of the cache relations. Columns 526 (labeled "CacheTable") and 528 (labeled "CacheColumn") indicate respectively the names of the table and column that is to be loaded in the cache corresponding to each of the cache relations. Column 529 (labeled "ResultBased") specifies a flag indicating whether the information cached is dependent on the result of a query (as indicated by the value "Yes") or not (as indicated by the value "No").

Each of rows 541-543 specifies a corresponding cache relation indicating that information corresponding to table "CacheTable" and column "CacheColumn" is to be loaded in a cache in the database system when table "QueryTable" and column "QueryColumn" are specified in a query.

In particular, row 541 (with row identifier "5001" as shown in column 520) specifies a cache relation indicating that the information corresponding to the table "Customer" and column "ROWID" (as shown in respective columns 526 and 528) is to be loaded into a cache in the database system, when a corresponding table "Customer" and column "Branch" (as shown in respective columns 522 and 524) is specified in a query. Further row 541 indicates that the information cached is not dependent on the result of the query (as indicated by the value "No" in column 529). Similarly, rows 542 and 543 depict other cache relations.

It may be appreciated that in row 542, the value in "CacheColumn" is shown as indicating that the data in all the columns is to be populated in the cache. As such, the data in the rows (instead of the row identifiers) is populated in the cache in response to receiving a query specifying a corresponding table/column. Request processor 150 may then generate a result of performance of a query based only on the information in the cache, without accessing data in data store 180 for any additional data required to perform the query.

The description is continued describing the manner in which cache relation data may be used for populating a cache in a database system.

FIG. 5B depicts sample information that is loaded in a cache in a database system as indicated by a cache relation data in response to a query specifying a corresponding table and column in one embodiment.

Request processor 150, on receiving query 410 (without hint), may inspect table 510 to determine whether any cache relations exist for table "Customer" and columns "CustomerID", "FullName" and "Branch", as specified by the query. On determining that cache relations specified in rows 541 and 543 match the table/column specified in the query, request processor 150 may then populate a cache with the information specified by the cache relations.

As such, according to row 541, the row identifiers of the rows (as indicated by the value "ROWID" in the column "CacheColumn") in the table "Customer" (as indicated by the column "CacheTable") associated with the column "Branch" in the "Customer" table are loaded in the cache.

Thus, request processor 150 may populate cache 170 with information similar to data portion 570. Data portion 570 depicts the row identifiers of the rows in the "Customer" table (as shown in the column labeled "Customer.ROWID") corresponding to the values of the column "Branch" (as shown in the column labeled "Customer.Branch") as indicated by row 541.

Further, according to row 543, the row identifiers of the rows (as indicated by the value "ROWID" in the column "CacheColumn") in the table "Account" (as indicated by the column "CacheTable") associated with the column "CustomerID" in the "Customer" table as specified by result 420 (as indicated by the value "Yes" in the column "ResultBased") are also loaded in the cache. Thus, request processor 150 may populate cache 170 with information similar to data portion 480 of FIG. 4B.

It may be appreciated that data portion 570 represents an index information specifying the specific ones of the plurality of rows of a table ("Customer") matching each of the values in a column ("Branch") of the same table. Such index information may be generated by the database system when required, or alternatively be maintained previously by the database system.

It may be noted that the index information (shown in data portion 570) differs from relation information (shown in data portion 480) in that the relation information provides a link between two tables while the index information provides for faster access of data in a table (based on the values of a column in the table). As such, the relation information may be similar to the result (or a portion thereof) of performing the operation of "join" (more specifically an "outer join") of the two tables, while the index information may be similar to internal indices maintained by a database system.

Further, the features of the present invention are described above with respect to two tables and a simple relation (existing between two tables) merely for illustration. However the approaches can be extended in the context of complex relations (existing between two or more tables) and also to multiple tables, without departing from the scope and spirit of the present invention, as will be apparent to one skilled in the relevant arts.

It should be appreciated that the features described above can be implemented in various embodiments as a desired combination of one or more of hardware, software and firmware. The description is continued with respect to an embodiment in which various features are operative when software instructions are executed.

8. Digital Processing System

Figure 6:
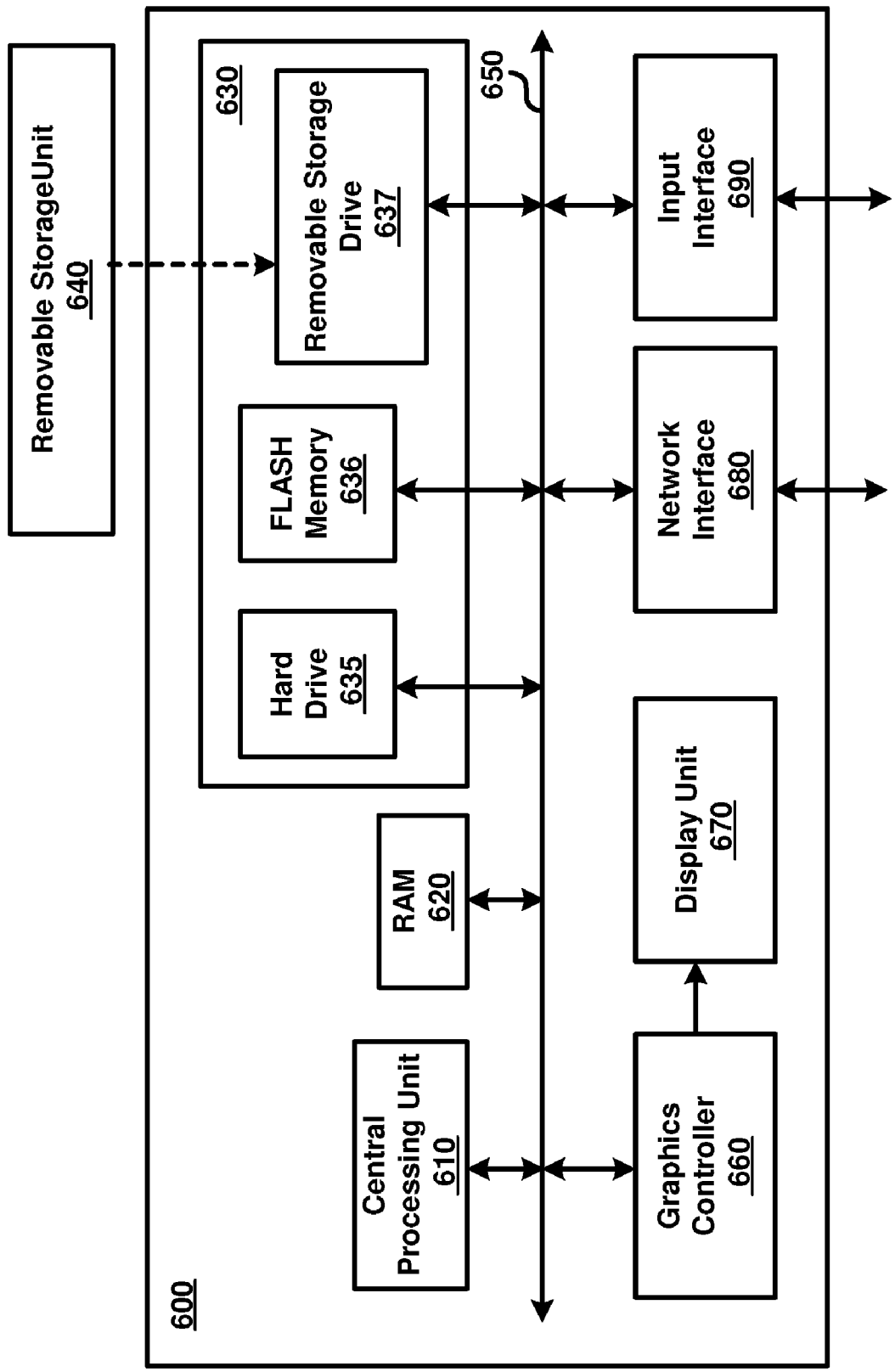
FIG. 6 is a block diagram illustrating the details of a digital processing system in which various aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to database manager 130 (executing request processor 150 and containing cache 170) or one of client systems 110A-110C.

Digital processing system 600 may contain one or more processors (such as a central processing unit (CPU) 610), random access memory (RAM) 620, secondary memory 630, graphics controller 650, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

Graphics controller 650 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse). Network interface 680 provides connectivity to a network (e.g., using Internet Protocol), and may be used to communicate with other connected systems (such as client systems 110A-110C or database manager 130) of FIG. 1.

Secondary memory 630 may contain hard drive 635, flash memory 635, and removable storage drive 637. Secondary memory 630 may store the data (e.g., portions of data depicted in FIGS. 3, 4A, 4B and 5) and software instructions, which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer implemented method of processing queries in database systems, said method comprising:
providing a plurality of tables in a database system to store data, wherein said plurality of tables are provided based on a storage contained in said database system;
responding, from said database system, to SQL (structured query language) queries received from external client systems and directed to said plurality of tables, wherein said responding is based on data in said plurality of tables as corresponding responses to the SQL queries;

receiving in said database system, from a first client system, an explicit indication indicating that an information in said plurality of tables of said database system is to be loaded into a cache contained in said database system;

examining said plurality of tables provided based on said storage to determine said information;

storing said information in said cache as a response to said receiving said explicit indication;

receiving, after receipt of said explicit indication, a first request from said first client system, said first request specifying a first query to be performed in said database system;

determining in said database system, that said information is required for performing said first query;

forming in said database system, a result of said first query based on said information in said cache; and sending to said first client system, said result as a response to said first request, wherein said first client system and said database system are implemented as separate systems, and wherein said first client system sends said explicit indication in response to determining that said information is required for processing said first query in said database system.

2. The method of claim 1, wherein said explicit indication is contained in a second request received prior to said first request from said first client system, wherein said examining and said storing are performed in response to receiving said second request.

3. The method of claim 2, wherein said second request is in the form of a second SQL (structured query language) query containing a comment, wherein said comment represents said explicit indication, wherein said comment is designed to be ignored by database systems not supporting processing of said explicit indication, wherein said method further comprises:

identifying that said comment is included in said second SQL query, wherein said examining and said storing are performed in response to said identifying.

4. The method of claim 1, wherein each table in said plurality of tables contains a plurality of rows to store corresponding data, wherein said information comprises at least one of:
A. data stored in some of said plurality of rows,
B. an index information specifying the specific ones of the plurality of rows of a table matching each of the values in a column of said table, and
C. a relation information indicating specific ones of the plurality of rows of a second table matching a corresponding value in a first column of a first table.

5. The method of claim 4, wherein said second table contains a reference to said first column, wherein said examining further comprises generating said relation information by inspecting the values in said first column in said first and second tables.

6. The method of claim 5, wherein said first column is specified as a primary key in said first table and as a foreign key in said second table.

7. A non-transitory computer readable medium storing one or more sequences of instructions for causing a database system to process queries, wherein said database system comprises a plurality of tables, wherein execution of said one or more sequences of instructions by one or more processors contained in said database system causes said database system to perform the actions of:

maintaining a cache relation table containing a plurality of rows, wherein each row indicates a corresponding information in said database system that is to be loaded into said cache when a corresponding table is specified in a query, wherein a first row in said cache relation table indicates that a first information is to be loaded into said cache in response to a first table contained in said plurality of tables being specified in a query;

receiving a third request specifying a third query to be performed on data contained in said first table in said database system;

in response to receiving of said third query:
sending a third result of processing of said third query, as a third response to said third request;
inspecting said first row of said cache relation table to determine that said first information is to be loaded into said cache due to said first table being specified in said third query;
examining a storage to determine said first information, said storage also being contained in said database system; and
storing said first information in said cache,
wherein said examining and said storing are performed after said inspecting;

receiving a first request from a client system, said first request specifying a first query to be performed in said database system;

determining in said database system, that said first information is required for performing said first query;

forming in said database system, a result of said first query based on said first information in said cache; and sending to said client system, said result as a response to said first request, wherein said client system and said database system are implemented as separate systems.

8. The computer readable medium of claim 7, wherein said first information stored in said cache contains at least a portion that is not contained in said third result.

9. The computer readable medium of claim 7, wherein said cache relation table is maintained on a non-volatile storage prior to receiving said third request and said first request.

10. The computer readable medium of claim 7, wherein said maintaining is performed based on data provided by an administrator of said database system.

11. A non-transitory computer readable medium storing one or more sequences of instructions for causing a database system to process queries, wherein execution of said one or more sequences of instructions by one or more processors contained in said database system causes said database system to perform the actions of:

providing a plurality of tables in a database system to store data, wherein said plurality of tables are provided based on a storage contained in said database system;

responding, from said database system, to SQL (structured query language) queries received from external client systems and directed to said plurality of tables, wherein said responding is based on data in said plurality of tables as corresponding responses to the SQL queries;

receiving in said database system, from a first client system, an explicit indication indicating that an information in said plurality of tables of said database system is to be loaded into a cache contained in said database system;

examining said plurality of tables provided based on said storage to determine said information;

storing said information in said cache as a response to said receiving said explicit indication;

receiving, after receipt of said explicit indication, a first request from said first client system, said first request specifying a first query to be performed in said database system;

determining in said database system, that said information is required for performing said first query;

forming in said database system, a result of said first query based on said information in said cache; and sending to said first client system, said result as a response to said first request, wherein said first client system and said database system are implemented as separate systems, and wherein said first client system sends said explicit indication in response to determining that said information is required for processing said first query in said database system.

12. The computer readable medium of claim 11, wherein said explicit indication is contained in a second request received prior to said first request from said first client system, wherein said examining and said storing are performed in response to receiving said second request.

13. The computer readable medium of claim 12, wherein said second request is in the form of a second SQL (structured query language) query containing a comment, wherein said comment represents said explicit indication, wherein said comment is designed to be ignored by database systems not supporting processing of said explicit indication, said actions further comprises:

identifying that said comment is included in said second SQL query, wherein said examining and said storing are performed in response to said identifying.

14. The computer readable medium of claim 11, wherein each table in said plurality of tables contains a plurality of rows to store corresponding data, wherein said information comprises at least one of:

A. data stored in some of said plurality of rows,

B. an index information specifying the specific ones of the plurality of rows of a table matching each of the values in a column of said table, and C. a relation information indicating specific ones of the plurality of rows of a second table matching a corresponding value in a first column of a first table.

15. The computer readable medium of claim 14, wherein said second table contains a reference to said first column, wherein said examining further comprises generating said relation information by inspecting the values in said first column in said first and second tables.

16. The computer readable medium of claim 15, wherein said first column is specified as a primary key in said first table and as a foreign key in said second table.

17. A computer implemented method of processing queries in a database system, wherein said database system comprises a plurality of tables, said method comprises:

maintaining a cache relation table containing a plurality of rows, wherein each row indicates a corresponding information in said database system that is to be loaded into said cache when a corresponding table is specified in a query, wherein a first row in said cache relation table indicates that a first information is to be loaded into said cache in response to a first table contained in said plurality of tables being specified in a query;

receiving a third request specifying a third query to be performed on data contained in said first table in said database system;

in response to receiving of said third query:

sending a third result of processing of said third query, as a third response to said third request;

inspecting said first row of said cache relation table to determine that said first information is to be loaded into said cache due to said first table being specified in said third query;

examining a storage to determine said first information, said storage also being contained in said database system; and storing said first information in said cache, wherein said examining and said storing are performed after said inspecting;

receiving a first request from a client system, said first request specifying a first query to be performed in said database system;

determining in said database system, that said first information is required for performing said first query;

forming in said database system, a result of said first query based on said first information in said cache; and sending to said client system, said result as a response to said first request, wherein said client system and said database system are implemented as separate systems.

18. The method of claim 17, wherein said first information stored in said cache contains at least a portion that is not contained in said third result.

19. The method of claim 17, wherein said cache relation table is maintained on a non-volatile storage prior to receiving said third request and said first request.

20. The method of claim 17, wherein said maintaining is performed based on data provided by an administrator of said database system.

21. A database system comprising:

a memory to store instructions;

a cache;

a processing unit to retrieve instructions from said memory and execute the retrieved instructions, wherein execution of the retrieved instructions causes said database system to perform the actions of:

responding to SQL (structured query language) queries received from external client systems and directed to a plurality of tables provided by said database system, wherein said responding is based on data in said plurality of tables as corresponding responses to the SQL queries;

receiving, from a first client system, an explicit indication indicating that an information in said plurality of tables of said database system is to be loaded into a cache contained in said database system;

examining said plurality of tables to determine said information;

storing said information in said cache as a response to said receiving said explicit indication;

receiving, after receipt of said explicit indication, a first request from said first client system, said first request specifying a first query to be performed in said database system;

determining that said information is required for performing said first query;

forming a result of said first query based on said information in said cache; and sending to said first client system, said result as a response to said first request, wherein said first client system and said database system are implemented as separate systems, and wherein said first client system sends said explicit indication in response to determining that said information is required for processing said first query in said database system.

22. The database system of claim 21, wherein said explicit indication is contained in a second request received prior to said first request from said first client system, wherein said examining and said storing are performed in response to receiving said second request.

23. The database system of claim 22, wherein said second request is in the form of a second SQL (structured query language) query containing a comment, wherein said comment represents said explicit indication, wherein said comment is designed to be ignored by database systems not supporting processing of said explicit indication, said actions further comprises:
  identifying that said comment is included in said second SQL query,
  wherein said examining and said storing are performed in response to said identifying.

24. The database system of claim 21, wherein each table in said plurality of tables contains a plurality of rows to store corresponding data,
  wherein said information comprises at least one of:
  A. data stored in some of said plurality of rows,
  B. an index information specifying the specific ones of the plurality of rows of a table matching each of the values in a column of said table, and
  C. a relation information indicating specific ones of the plurality of rows of a second table matching a corresponding value in a first column of a first table.

25. The database system of claim 24, wherein said second table contains a reference to said first column, wherein said examining further comprises generating said relation information by inspecting the values in said first column in said first and second tables.

26. The database system of claim 25, wherein said first column is specified as a primary key in said first table and as a foreign key in said second table.

27. A database system comprising:
  a memory to store instructions;
  a cache;
  a processing unit to retrieve instructions from said memory and execute the retrieved instructions, wherein execution of the retrieved instructions causes said database system to perform the actions of:
    maintaining a cache relation table containing a plurality of rows, wherein each row indicates a corresponding information in said database system that is to be loaded into said cache when a corresponding table is specified in a query, wherein a first row in said cache relation table indicates that a first information is to be loaded into said cache in response to a first table being specified in a query, wherein said first table is contained in a plurality of tables provided by said database system;
    receiving a third request specifying a third query to be performed on data contained in said first table in said database system;
    in response to receiving of said third query:
      sending a third result of processing of said third query, as a third response to said third request;
      inspecting said first row of said cache relation table to determine that said first information is to be loaded into said cache due to said first table being specified in said third query;
      examining a storage to determine said first information, said storage also being contained in said database system; and
      storing said first information in said cache,
      wherein said examining and said storing are performed after said inspecting;
    receiving a first request from a client system, said first request specifying a first query to be performed in said database system;
    determining in said database system, that said first information is required for performing said first query;
    forming in said database system, a result of said first query based on said first information in said cache; and
    sending to said client system, said result as a response to said first request,
    wherein said client system and said database system are implemented as separate systems.

28. The database system of claim 27, wherein said first information stored in said cache contains at least a portion that is not contained in said third result.

29. The database system of claim 27, wherein said cache relation table is maintained on a non-volatile storage prior to receiving said third request and said first request.

30. The database system of claim 27, wherein said maintaining is performed based on data provided by an administrator of said database system.

* * * * *

UNITED STATES PATENT AND TRADEMARK OFFICE
CERTIFICATE OF CORRECTION

PATENT NO.       : 8,185,546 B2
APPLICATION NO.  : 11/860550
DATED            : May 22, 2012
INVENTOR(S)      : Kumbi et al.

It is certified that error appears in the above-identified patent and that said Letters Patent is hereby corrected as shown below:

In column 8, line 42, delete "Custmomer.CustomerID" and insert -- Customer.CustomerID --, therefor.

In column 10, line 40, after "as" insert -- "*" --.

Signed and Sealed this
Twenty-eighth Day of August, 2012

David J. Kappos
*Director of the United States Patent and Trademark Office*